US006757356B2

(12) United States Patent
Yagi

(10) Patent No.: US 6,757,356 B2
(45) Date of Patent: Jun. 29, 2004

(54) ELECTRIC DISCHARGE DETECTION CIRCUIT

(75) Inventor: Shigeki Yagi, Chiba (JP)

(73) Assignee: Seiko Instruments Inc., Chiba (JP)

(*) Notice: Subject to any disclaimer, the term of this patent is extended or adjusted under 35 U.S.C. 154(b) by 0 days.

(21) Appl. No.: 10/032,295

(22) Filed: Dec. 21, 2001

(65) Prior Publication Data

US 2002/0110219 A1 Aug. 15, 2002

(30) Foreign Application Priority Data

Dec. 25, 2000 (JP) .................................... 2000-393133

(51) Int. Cl.[7] ........................................ G01B 31/24

(52) U.S. Cl. ......................... 378/118; 378/119; 378/98

(58) Field of Search ......................... 378/118, 98, 111, 378/114, 119, 117

(56) References Cited

U.S. PATENT DOCUMENTS 4,125,773 A * 11/1978 Aldenhovel ................. 250/413
4,234,793 A * 11/1980 Amtmann ................... 250/414
4,376,880 A * 3/1983 Inoue ...................... 219/69 M
4,601,051 A * 7/1986 Santurtun et al. ........... 378/118
5,008,916 A * 4/1991 Le Guen .................... 378/118
5,561,578 A * 10/1996 Shimoyanagida ............ 361/91
6,192,106 B1 * 2/2001 Miller et al. ................ 378/123
6,453,009 B2 * 9/2002 Berezowitz et al. ........ 378/118

* cited by examiner

*Primary Examiner*—Craig E. Church
*Assistant Examiner*—Irakli Kiknadze
(74) *Attorney, Agent, or Firm*—Brink Hofer Gilson & Lione

(57) ABSTRACT

An electric discharge detection circuit includes an x-ray tube, a power supply that applies a high voltage to the x-ray tube, a tube voltage that detects the voltage applied to the x-ray tube, a differentiation circuit that differentiates a signal output from the tube voltage detector, a zero-crossing comparator that discriminates the polarity of an output signal from the differentiation circuit; a re-triggerable one-shot pulse generating circuit that generates one-shot pulses at a regular period, using the pulse output from zero-crossing comparator as the trigger, a counter that is input with the one-shot pulse output and counts the pulses to output from the zero-crossing comparator while operation is enabled period, an x-ray cut-off circuit that terminates the generation of high voltage when it receives the carry output and a display that displays the occurrence of an electric discharge phenomenon upon receipt of the carry output.

7 Claims, 4 Drawing Sheets

ELECTRIC DISCHARGE DETECTION CIRCUIT

BACKGROUND OF THE INVENTION

The present invention relates to an electric discharge detection circuit used in fluorescence x-ray analyzers.

An x-ray tube voltage applied to an x-ray tube can be monitored by resistance division of the output from a high voltage power supply used for an x-ray tube with a high resistance and a high withstand voltage. Whether there is an electric discharge phenomenon or not is determined by the detecting the electric voltage in proportion to the tube voltage obtained through the aforementioned method, i.e. a sharp drop in the monitored level of the X-ray tube voltage.

A filter circuit is typically used for eliminating high frequency noise originating from the x-rays. A sharp drop in the monitored tube voltage output level, which is input to the differentiation circuit through the filter circuit, is detected by comparing the voltage level outputted from this differentiation circuit with a specified reference voltage level by means of a comparator. However, the degree to which the monitored level of tube voltage drops is not stable, making it difficult to set constant values for the differentiation circuit and the reference voltage.

For example, when the constant used for differentiation is set to be small or the reference voltage is set too high, electric discharge phenomenon may not be detected if the extent to which the monitored tube voltage output level has dropped is relatively moderate. If the analyzer is used continuously for a long period of time without detecting any electric discharge, overload current that flows into high voltage circuits may damage various high voltage parts and units, including the connectors and the power supply. Moreover, the high frequency current that flows inside the device while the electric discharge taking place may have a detrimental effect on the workings of electronic circuits and may also damage the electronic parts.

On the other hand, when the constant used for differentiation is set to be large or the reference voltage is set at a low level, insignificant fluctuations in tube voltage that actually have no relation to electric discharge may be erroneously detected as an electric discharge phenomena. Furthermore, a variety of electrical and electronic parts are assembled in the fluorescence x-ray analyzer. If an output such as a surge caused by these internal parts is superimposed on the tube voltage monitor, the filter circuit located in front of the differentiation circuit may not be able to eliminate it, and as a result, the analyzer may misjudge it to be a cause of electric discharge phenomenon. If the analyzer responds hypersensitively to the changes in the monitored tube voltage output level, the safety circuit will be activated frequently and may stop the analyzer whenever x-rays are generated, thus reducing its measurement throughput capacity.

SUMMARY OF THE INVENTION

Thus, advantages of the following embodiments include preventing malfunctions caused by noise, and furthermore, providing a highly reliable electric discharge detection circuit for an x-ray analyzer.

To solve the problems described above, the present invention provides an electric discharge detection circuit, comprising: an x-ray tube; a power supply to generate a high voltage applied to the x-ray tube; an x-ray tube voltage detector to detect the high voltage applied to the x-ray tube; a differentiation circuit to differentiate the signal output from the tube voltage detector, a zero-crossing comparator that discriminates the polarity of the output signal from the differentiation circuit; a re-triggerable one-shot pulse generating circuit to generate a one-shot pulse at a regular period, using the pulse outputted from the zero-crossing comparator as a trigger; a counter having the one-shot pulse output from one-shot pulse generating circuit input as an operation enable signal, to count pulses output from the zero-crossing comparator while operation is enabled; an x-ray cut-off circuit to send a command signal to the power supply to stop the generation of high voltage when it receives a carry output from the counter; and a display to display the fact that an electric discharge phenomenon is occurring upon receipt of the carry output from the counter.

According to this structure, an electric discharge phenomenon that occurs in an x-ray generating system is displayed in the form of a pulse train. These pulses act as the trigger to generate one-shot pulses at a regular period that is input to the counter as an operation enable signal. The counter counts the pulses input while operation is enabled and outputs a carry when the pulse count reaches a preset value. The display receives this carry output displays the electric discharge phenomenon and notifies this fact to the user. An x-ray cutoff circuit that also receives this carry output simultaneously sends out a command to the power supply to switch off its high voltage output. Since the one-shot pulse generating circuit is re-triggerable, it will keep on outputting the operation enable signal to the counter as long as the pulse train is generated continuously within the set period. On the contrary, if only a single pulse is generated, the counter will not reach its “count-up” state since it will be reset immediately after the expiration of the set period. As a result, only electric discharge phenomena that are persistent will be detected, thus allowing for prevention of electric discharge from causing critical damage to the analyzer.

DETAILED DESCRIPTION OF THE INVENTION

An embodiment of the present invention will be described in the following based on the drawings.

Figure 1:
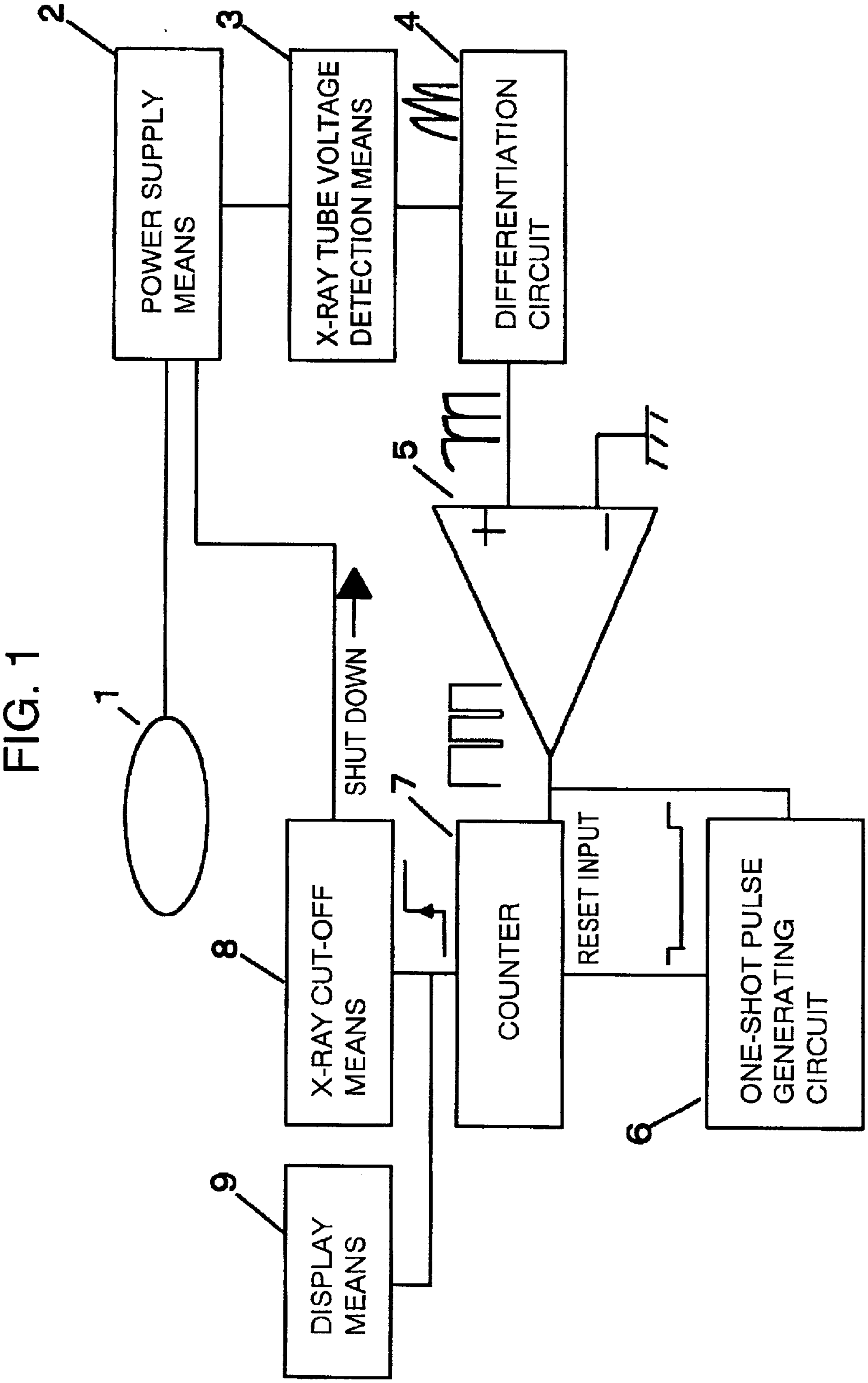
FIG. 1 is a drawing showing the configuration of an electric discharge detection circuit of the present invention.

FIG. 1 shows the configuration of the present invention. In the fluorescence x-ray analyzer, high voltage ranging between 5 kV and 50 kV is applied to the x-ray tube to generate x-rays. The x-ray tube 1 is provided immersed in insulating oil inside a housing that has been subjected to x-ray cut-off protection. The high voltage is applied to this tube from a power supply unit via a high voltage cable. It is also possible for the driver section of the power supply (not shown) to be installed inside the housing together with the x-ray tube 1. The high voltage applied to the x-ray tube 1 is extracted from the voltage output of the power supply unit after being divided by a voltage divider using a high withstand voltage resistor. The level of high voltage applied to the x-ray tube 1 can be reverse calculated from the resistance dividing ratio and the voltage obtained through a passive filter used for eliminating high frequency noise derived from the x-rays.

Normally, the tube voltage monitor circuit composed of this resistance and the passive filter is incorporated in the power supply unit. Although that may often be the case, in this embodiment, the description of these functions will separated into the power supply 2 and tube voltage detector 3. Electric discharge phenomenon occurs in various forms, including glow discharge inside an x-ray tube, discharge between the x-ray tube 1 and the housing wall, and discharge in a high voltage cable connection area. Taking the discharge between the x-ray tube 1 and the housing wall for example, once this phenomenon occurs, a discharge path will be created in the pool of insulating oil, and from then on, discharge phenomenon will occur continuously through this path, ultimately damaging the power supply unit and high voltage cables. Moreover, the discharge will cause high frequency current to flow everywhere inside the analyzer, causing its electronic parts to malfunction, and destruction of its elements in some cases. Even if the analyzer is not damaged by the electric discharge, any voltage generating system that has once experienced an extensive discharge phenomenon will no longer be able to recover itself fully to a normal working state. Thus it is important for the analyzer to be capable of detecting critical electric discharge phenomena with very high reliability, displaying the fact in the event of its occurrence and cutting off the power supplied to the x-ray tube 1 as early as possible to minimize the adverse effect caused by this phenomenon.

Figure 2:
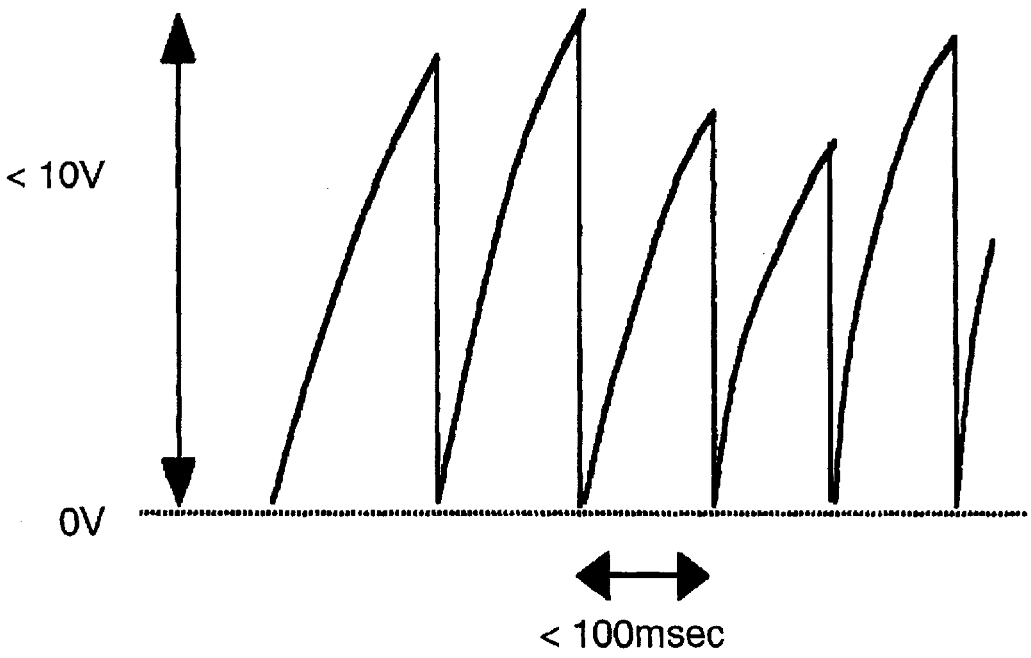
FIG. 2 is a drawing showing the tube voltage monitor waveform that can be observed when electric discharge is taking place.

FIG. 2 represents the distinctive kind of waveform of the output voltage observed on the tube voltage monitor while the electricity is either being discharged between the x-ray tube 1 and the housing wall or in the high voltage cable connection area. The voltage drops sharply to ground level, then rises, and dives again. The voltage repeats this sharp up/down movement in a cycle of several tens of msec. As illustrated in FIG. 2, the peak level of the voltage is not uniform and tends to vary over a significant voltage. Taking as a result, the tube voltage monitor voltage is fed into a zero-crossing comparator 5 to convert the up/down movement of the voltage into a pulse train, after differentiating it in the differentiation circuit 4. The pulse train outputted from zero-crossing comparator 5 is inputted into counter 7, where the pulses are counted.

This pulse train is also inputted to a one-shot pulse generating circuit 6 where the pulse train acts as the trigger for pulse generation. The output of this one-shot pulse generating circuit 6 is connected to the reset input of the counter 7, and normally, the output of this one-shot pulse generating circuit 6 provides the signals to reset the counter 7. When electric discharge occurs, the pulse train is inputted into the one-shot pulse generating circuit 6 to trigger the generation of one-shot pulse. As a result, the one-shot pulse triggered by the pulse train makes the reset signal sent to counter 7 invalid for a preset period $\tau$ (set time $\tau$), and enables the counting operation of the counter 7 during this period. The one-shot pulse generating circuit 6 is configured to be re-triggerable, and therefore continues to cancel the reset command, sent to counter 7 every time the one-shot pulse is inputted into this counter 7 within the preset period. The total number of pulses the counter 7 counts up to is set beforehand. The counter 7 outputs the carry when the number of pulses received to count reaches the preset total while the reset command is nullified, i.e. within the operation enable period of the counter 7. Therefore, the counter 7 will count up to the preset total only when it is input with a series of pulses consecutively received within successive periods $\tau$ set in the one-shot pulse generating circuit 6 (i.e. the counter 7 counts so long as the next pulse of the series of pulses arrives within $\tau$ of the last pulse). This is the case shown in FIG. 3.

Figure 3:
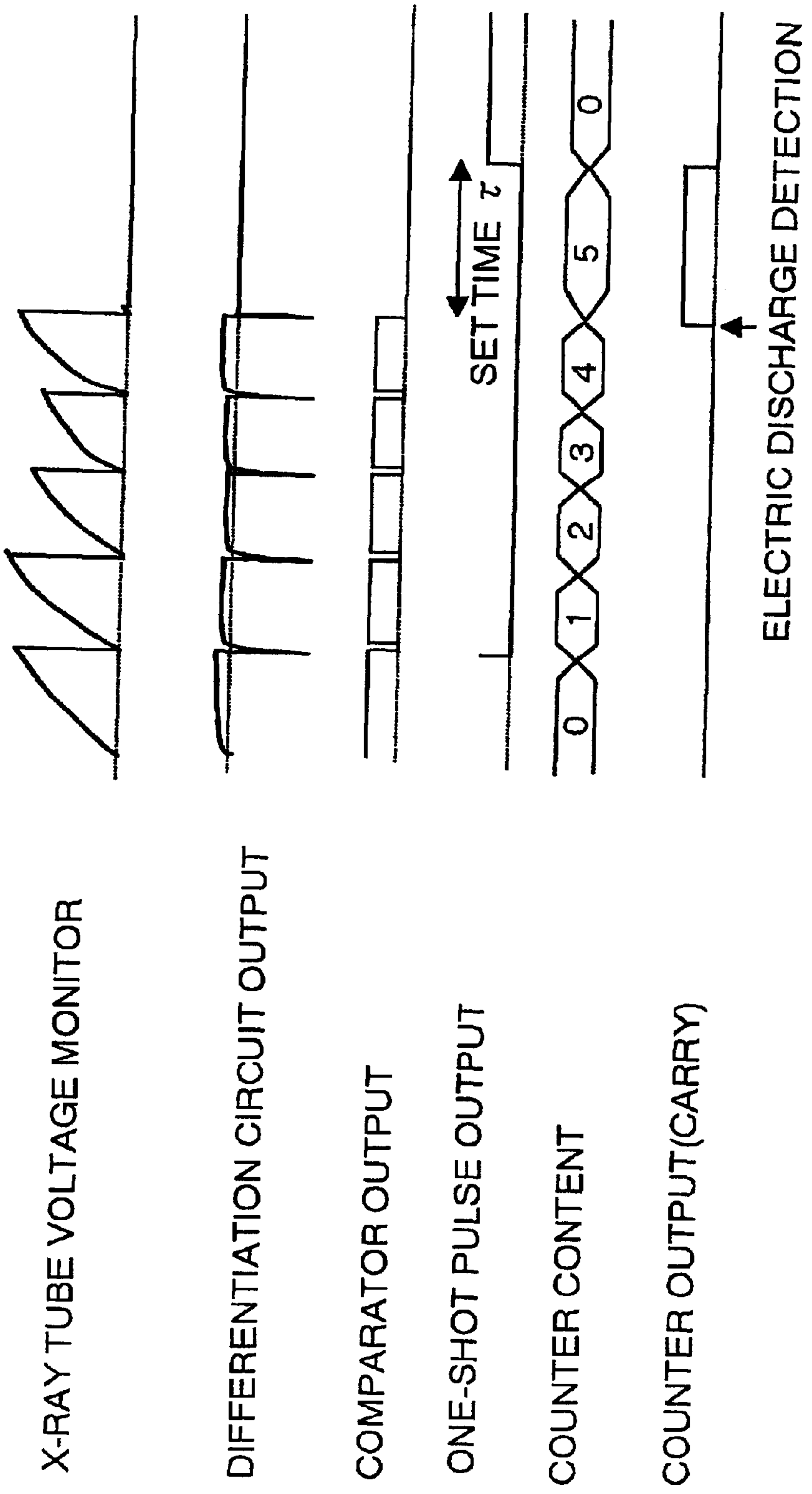
FIG. 3 is a timing chart showing how the system operates when the counter counts up.

In the example shown in FIG. 3, the total to which counter 7 is set to count up is 5. In FIG. 3, the first pulse (pulse 1) triggers the one-shot pulse generating circuit 6, which then outputs a one-shot pulse for a time period of set time $\tau$. Pulse 1 also triggers the counter 7 and the counter 7 thereby increments its output from zero to one. If there is no more pulse inputted to the one-shot pulse generating circuit 6 within the time period of set time $\tau$, the counter 7 will be reset when the set time $\tau$ expires. However, in FIG. 3, a next pulse (pulse 2) is inputted before the set time $\tau$ expires. As a result, pulse 2 triggers again the one-shot pulse generating circuit 6, which maintains its output for another set time $\tau$. In FIG. 3, there are five pulses inputted in total. Therefore, the one-shot pulse generating circuit 6 resets the counter 7 when the fifth set time $\tau$, which is triggered by pulse 5, expires.

Figure 4:
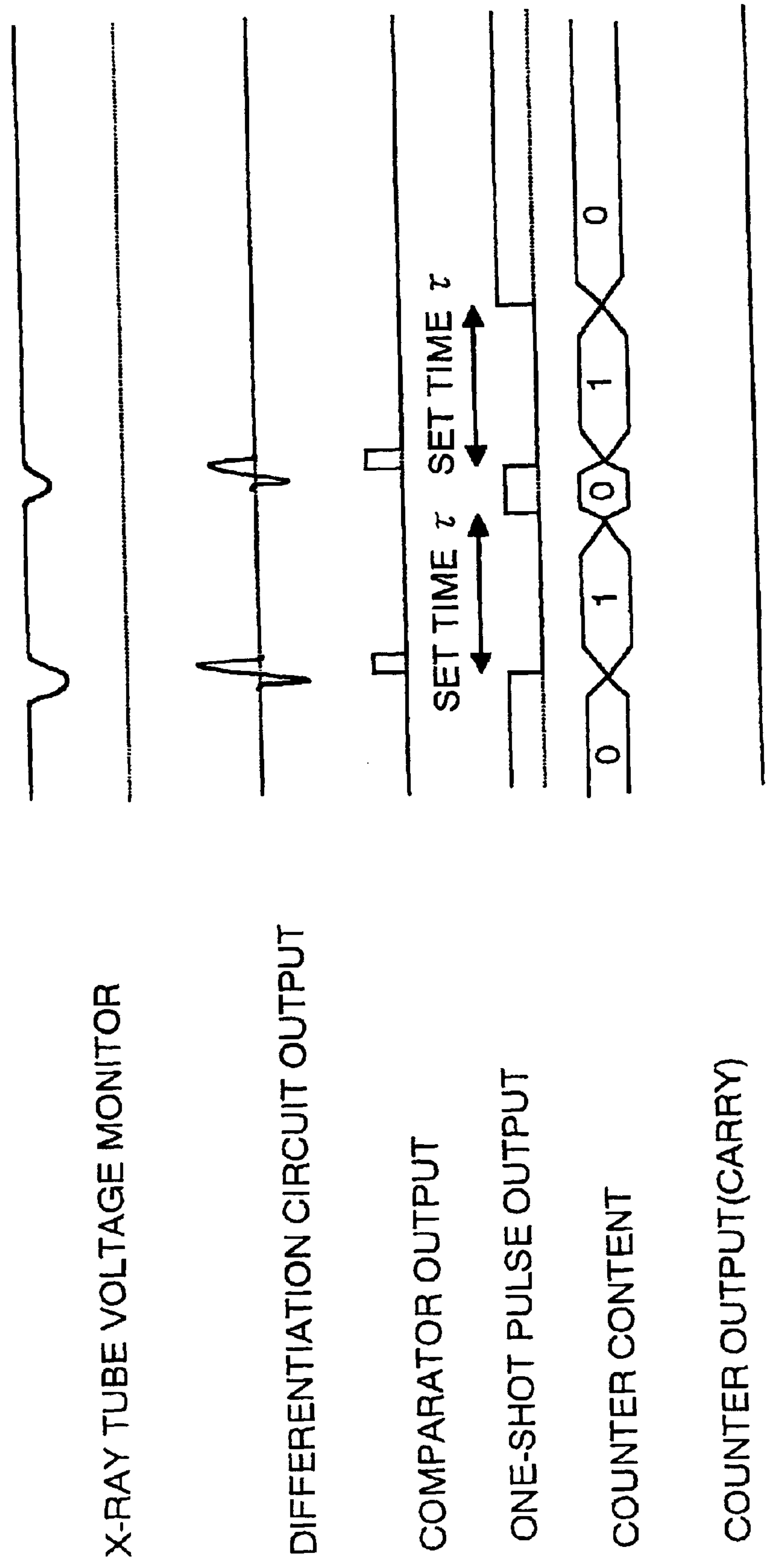
FIG. 4 is the timing chart that shows how the system operates when the counter does not count up.

FIG. 4 shows the case when counter 7 does not count up to the preset total even when there is pulse input. In other words, the second pulse does not arise within the time period of set time $\tau$ that is triggered by the first pulse. This example in FIG. 4 represents when a minor discharge phenomenon that has substantially no effect on the performance of x-ray generating system occurs as a one-time event by the tube voltage dropping sharply only momentarily (due to some kind of abnormal condition in the power supply unit). The carry output from counter 7, when it counts the number of input pulses up to the preset total, is sent to the display 9. The display 9 includes an optical display, such as lamps and a PC monitor, and to notify the users of the analyzer that a critical electric discharge phenomenon has occurred in the x-ray generating system. The carry output from counter 7 is also transmitted to an x-ray cut-off circuit 8. The x-ray cut-off circuit 8, when activated, is designed to protect the analyzer by stopping the power supply 2 from generating high voltage.

The x-ray cut-off operation is implemented through a highly reliable mechanism to detect only long-sustaining critical electric discharge phenomena by configuring a system that differentiates the output of tube voltage detector to detect the tube voltage applied to an x-ray tube with a differentiation circuit, counts the number of pulses inputted into the counter (while the counting operation is enabled by the output of an one-shot pulse generating circuit), notifies users of the analyzer that an electric discharge phenomenon is taking place through a display that receives the carry output from the counter when the number of pulses it counts reaches the preset total, and directs the power supply to switch off the high voltage output applied to the x-ray tube by using an x-ray cut-off circuit that outputs the switch off command when the x-ray cut-off circuit receives the carry output simultaneously from the counter. Of course, the detector combination above is only one example of such a general discrimination circuit Other discrimination circuits may discriminate between substantial changes in the signal output from the x-ray tube voltage detector within a predetermined time period (the x-ray cut-off circuit terminating generation of the high voltage when the number of substantial changes exceeds a preset amount within the predetermined time period and the display displaying that the preset amount has been exceeded).

Thus, the present invention is effective in preventing minor electrical problems that may arise in the analyzer from developing into a major problem. Moreover, this invention is also effective in preventing the x-rays from being cut-off whenever the analyzer falls into a minor unstable state that has no effect on its performance and lowering the functionality of its measurement throughput.

What is claimed is:

1. A method of protecting an x-ray analyzer comprising:

applying a high voltage to a x-ray tube;

monitoring a discharge phenomenon that occurs in an x-ray generating system as a pulse array representing fluctuations of the x-ray tubes voltage caused by the discharge phenomenon;

counting a pulse number of the pulse array; and terminating the high voltage output to the x-ray tube when the pulse number reaches a predetermined value.

2. An electric discharge detection circuit comprising:

an X-ray tube;

a power supply to generate a high voltage applied to the x-ray tube;

an x-ray tube voltage detector to detect the high voltage applied to the x-ray tube;

a differentiation circuit to differentiate a signal output from the x-ray tube voltage detector;

a zero-crossing comparator to discriminate a polarity of an output signal from the differentiation circuit;

a re-triggerable one-shot pulse generating circuit that generates a one-shoot pulse at a fixed period, a pulse output from the zero-crossing comparator being a trigger of the one-shot pulse generating circuit input; an operation enable signal to count pulses output from the zero-crossing comparator during a period when operation is enabled;

an x-ray cut-off circuit to transmit a command signal to the power supply to stop generation of high voltage when receiving a carry output from the counter; and a display to display occurrence of an electric discharge phenomenon upon receipt of the carry output from the counter.

3. An electric discharge detection circuit comprising:

an X-ray tube;

a power supply to generate a high voltage applied to the x-ray tube;

an x-ray tube voltage detector to detect the high voltage applied to the x-ray tube;

a discrimination circuit to discriminate between substantial changes caused by discharge phenomenon in a signal output from the x-ray tube voltage detector within a predetermined time period, an x-ray cut-off circuit to terminate generation of the high voltage by the power supply when a number of the substantial changes in the signal output from the x-ray tube voltage detector within the predetermined time period exceeds a present amount; and a display to display the present amount has been exceeded.

4. A device for detecting electric discharges of electricity applied to an x-ray tube, comprising:

a monitor that monitors a voltage on the x-ray tube and identifies fluctuations of the voltage;

a counter that counts the voltage fluctuations for a predetermined time period; and a cut-off circuit that cuts off supply of electricity to the x-ray tube when a count of the voltage fluctuation reaches a predetermined value for the predetermined time period.

5. A device of claim 4, wherein the monitor includes a differentiation circuit that transforms the voltage fluctuations into pulse arrays.

6. A device of claim 5, further comprising a chronometer that starts clocking the predetermined time period upon detection of a first pulse of a pulse array.

7. A device of claim 6, wherein the counter starts counting the pulse array from the first pulse and is reset by the chronometer when the predetermined time period elapses.

* * * * *